Patented Feb. 16, 1954

2,669,582

UNITED STATES PATENT OFFICE 2,669,582

BASICALLY SUBSTITUTED AMIDES OF DICARBOXYLIC ACIDS

John W. Cusic, Skokie, Ill., assignor to G. D. Searle & Co., Chicago, Ill., a corporation of Illinois No Drawing. Application April 5, 1952,
Serial No. 280,855

13 Claims. (Cl. 260—558)

The present invention pertains to a group of new organic compounds and, in particular, to amides of dicarboxylic acids substituted at each of the amido nitrogen atoms by a basically substituted alkyl radical and an aromatic hydrocarbon radical, to their salts and to methods for their production. The amides of my invention can be represented as the bases of the general structural formula

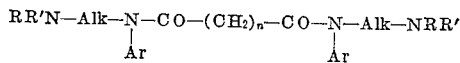

and their salts, wherein Ar is a lower aromatic radical, Alk is a lower alkylene radical containing at least 2 carbon atoms, $n$ is a whole number between 0 and 8 inclusive, and NRR' is a member of the class consisting of lower dialkylamino radicals and saturated nitrogen-containing heteromonocyclic radicals.

In the foregoing structural formula Ar can be a lower aryl radical of from 6 to 10 carbon atoms such as phenyl, naphthyl or a lower alkylated phenyl radical such as tolyl, xylyl and cumyl. Further, Ar can be an aralkyl radical wherein an aryl group of the foregoing type is connected to the amido nitrogen by a lower alkylene radical as in the case of benzyl, phenethyl, phenylbutyl, tolylmethyl, naphthylethyl and like radicals.

The radical Alk is a lower bivalent saturated aliphatic hydrocarbon radical and includes such straight chain or branched chain hydrocarbon radicals as ethylene, propylene, butylene, amylene, hexylene and polymethylene radicals such as trimethylene, tetramethylene, pentamethylene, hexamethylene, heptamethylene and octamethylene. The radical $(CH_2)_n$ can be an alkylene radical of the same type as well as methylene or, in the case of $n$ being 0, a direct linkage between the two carbonyl radicals.

Among the radicals which R and R' can represent are such lower alkyl groups as methyl, ethyl, propyl, butyl, amyl, and hexyl, wherein the propyl, butyl, amyl and hexyl groups may be either of the straight chain or branch chain type. The radical NRR' can also be a saturated nitrogen-containing heteromonocyclic group attached to the radical B through a nitrogen in the heteromonocycle; examples for such heteromonocycles are N-piperidino, N-lupetidino, N-pyrrolidino, N-morpholino, N-thiamorpholino and N'-alkyl-N-piperazino radicals.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide new chemical substances of the type indicated above. These new substances possess a number of highly useful therapeutic properties. Thus the simple addition salts of the bases described have been found to be potent cardiovascular and, especially, diuretic agents. They are especially useful in edema since they increase not only the excretion of water but also of sodium. The quaternary ammonium salts find application as intestinal parasiticides and as autonomic ganglion blocking agents.

The amides of my invention are prepared conveniently by heating a basically substituted aralkylamine of the structural formula

with an acid halide of the type

all symbols being defined as hereinabove.

The following examples illustrate in detail certain of the compounds which comprise this invention and methods for producing the same. However, this invention is not to be construed as limited in spirit or in scope thereby. It will be apparent to organic chemists that many modifications in materials and methods may be made without departing from the invention. In each of these examples, temperatures are given in degrees centigrade (° C.), relative amounts of materials in parts by weight and pressures during vacuum distillations in millimeters (mm.) of mercury.

EXAMPLE 1

*Bis(β-diethylaminoethyl) oxanilide*

Upon mixing of 250 parts of oxalyl chloride with a solution of 900 parts of N-(β-diethylaminoethyl) aniline in 2500 parts of butanone, a very vigorous reaction occurs which is completed by heating at reflux temperature for 3 hours. The reaction mixture is then concentrated on the steam bath and treated with a large volume of ice and dilute hydrochloric acid. The aqueous layer is separated, rendered alkaline by addition of sodium hydroxide and extracted with ether. This ether extract is dried over anhydrous potassium carbonate, filtered and evaporated to yield the bis(β-diethylaminoethyl)oxanilide as an oil which distils at about 246–247° C. and 3 mm. pressure.

EXAMPLE 2

*Bis(β-diethylaminoethyl) oxanilide dimethobromide*

To a solution of 150 parts of bis(β-diethylaminoethyl)oxanilide in 400 parts of butanone, 200 parts of methyl bromide are added in a shielded pressure vessel. Towards the end of the addition a heavy precipitate forms. After standing for an hour at room temperature the very hygroscopic salt is collected on a filter and dissolved in warm isopropanol. The salt is reprecipitated with ether and recrystallized from a mixture of ethyl acetate and isopropanol, using charcoal decolorization. The bis(β-diethylaminoethyl)oxanilide dimethobromide thus obtained melts at about 198–200° C. and has the structural formula

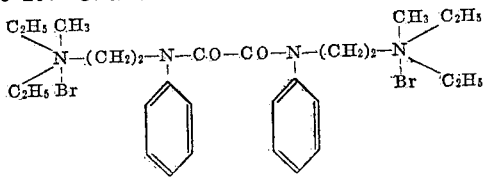

EXAMPLE 3

*N,N'-bis(β-diethylaminoethyl)-N,N'-bis(α-1-naphthylethyl)oxalamide*

A solution of 340 parts of 1-acetonaphthone in 200 parts of ethanol is treated with 232 parts of N,N-diethylethylenediamine and 75 parts of Raney nickel, and the mixture is hydrogenated in a Parr medium pressure bomb at 650–750 lbs. pressure and 115–120° C. for 10 hours. After cooling the contents of the bomb are filtered and the solvent is evaporated at atmospheric pressure. The N-(β-diethylaminoethyl)-α-methyl-1-naphthylamine is then distilled at about 145° C. and 0.3 mm. pressure.

A solution of 428 parts of the distillate in 5000 parts of butanone is treated with 127 parts of oxalyl chloride and the mixture is heated at reflux temperature for 2 hours and then treated with methanol to decompose any unreacted oxalyl chloride. Upon concentration the dihydrochloride of N,N'-bis(β-diethylaminoethyl)-N,N'-bis(α-1-naphthylethyl)oxalamide precipitates. The latter is collected on a filter and dissolved in a large volume of dilute hydrochloric acid. The solution is washed well with ether and rendered alkaline by addition of sodium hydroxide. This extract is dried over anhydrous calcium sulfate, stirred with decolorizing charcoal, filtered and evaporated to yield the N,N'-bis-(β-diethylaminoethyl)-N,N'-bis(α-1-naphthylethyl)-oxalamide as a clear, light yellow, high boiling oil. It has the structural formula

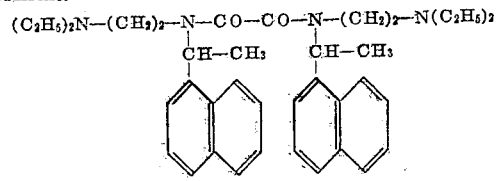

EXAMPLE 4

*N,N'-bis(δ-dimethylaminobutyl)-N,N'-di-p-tolylmalonamide*

A suspension of 160 parts of p-aminotoluene, 172 parts of the hydrochloride of δ-chlorobutyldimethylamine, 311 parts of potassium carbonate and 5 parts of copper bronze powder in 800 parts of benzene is heated under reflux with stirring for 10 hours. The reaction mixture is then treated with 1400 parts of 10% aqueous sodium hydroxide and extracted with ether. This ether extract is washed with water and saturated sodium chloride solution, dried over anhydrous magnesium sulfate, filtered and evaporated, yielding the N,N-dimethyl-N'-(p-tolyl)putrescine as an oil which is distilled at about 122–128° C. and about 3 mm. pressure.

A solution of 412 parts of this distillate in 2500 parts of butanone is mixed slowly with 131 parts of malonyl chloride and, after subsidence of the initial reaction, the mixture is heated at reflux temperature for 2 hours. At that time ethanol is added to destroy the unreacted acid chloride after which the reaction mixture is extracted with cold dilute hydrochloric acid and the extract is washed with ether, rendered alkaline by addition of sodium hydroxide and extracted with ether. This ether extract is dried over anhydrous calcium sulfate, stirred with decolorizing charcoal, filtered and evaporated to yield the N,N'-bis(δ-dimethylaminobutyl)-N,N'-di-p-tolylmalonamide as a clear oil which is distilled at about 243–252° C. and about 2 mm. pressure. It has the structural formula

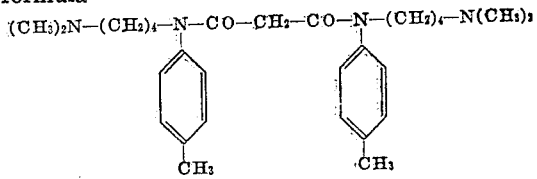

EXAMPLE 5

*Bis(β-diethylaminoethyl)succinanilide*

A solution of 576 parts of N-(β-diethylaminoethyl)-aniline in 2400 parts of butanone is mixed slowly with 227 parts of succinyl chloride with cooling. A vigorous reaction occurs and a solid precipitate forms. The reaction is completed by heating at reflux temperature for 2 hours and ethanol is added to destroy unreacted acid chloride. After cooling, the precipitate is collected on a filter and recrystallized from dilute isopropanol, using charcoal decolorization. Recrystallized from ethanol this dihydrochloride melts at about 204–205° C. The free bis(β-diethylaminoethyl)-succinanilide, isolated by alkalinization of an aqueous solution of the dihydrochloride, ether extraction, drying and concentration, boils at about 245–250° C. and 2 mm. pressure.

EXAMPLE 6

*Bis(β-diethylaminoethyl)succinanilide methobromide*

A solution of 150 parts of bis(β-diethylaminoethyl)-succinanilide in 1900 parts of chloroform is treated with 200 parts of methyl bromide and the solution is heated in a shielded pressure reactor at 80° C. for 2 hours. A solid precipitate forms within a few minutes. After cooling and treatment with ether the bis(β-diethylaminoethyl)succinanilide methobromide is collected on a filter and recrystallized from dilute isopropanol. It melts at about 277–278° C. with decomposition and has the structural formula

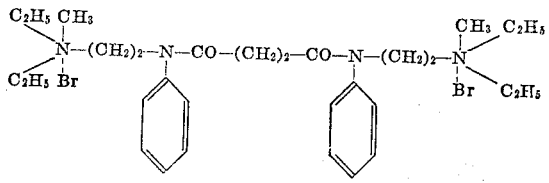

EXAMPLE 7

N,N'-(β-diethylaminoethyl)-N,N'-dibenzyl-succinanilide

A solution of 412 parts of N-(β-diethylaminoethyl)-benzylamine in 2500 parts of butanone is mixed with 155 parts of succinyl chloride and heated at reflux temperature for 2 hours, after which ethanol is added to destroy the unreacted acid chloride. After concentration on the steam bath the reaction mixture is extracted with dilute hydrochloric acid and the extract rendered alkaline and extracted with ether. The ether extract is dried over anhydrous potassium carbonate, filtered and evaporated, yielding the N,N'-bis(β-diethylaminoethyl)-N,N'-dibenzyl-succinanilide as on oily base distilling at about 264–267° C. and 2 mm. pressure. A solution of the distillate in ether is treated with one equivalent of hydrogen chloride in ethanol and upon concentration the dihydrochloride precipitates. Recrystallized from isopropanol, this salt melts at about 210–211° C. It has the structural formula

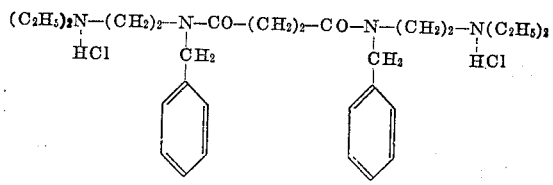

EXAMPLE 8

Bis(β-diethylaminoethyl) adipanilide

A solution of 576 parts of N-(β-diethylaminoethyl)-aniline in 2500 parts of butanone and 274 parts of adipyl chloride is mixed with cooling. A solid precipitate forms. The reaction is completed by heating at reflux temperature for 2 hours after which ethanol is added to decompose the unreacted acid chloride. After treatment with dilute hydrochloric acid the aqueous layer is separated, rendered alkaline and extracted with ether. This ether extract is dried over anhydrous potassium carbonate, filtered and evaporated to yield the oily bis(β-diethylaminoethyl) adipanilide which is distilled at about 274–276° C. and 2 mm. pressure. It has the structural formula

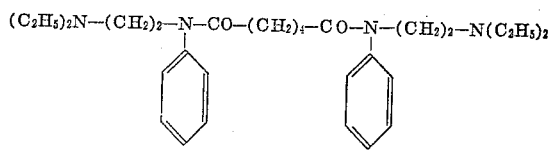

EXAMPLE 9

N,N'-bis(β-diethylaminoethyl-N,N'-di(2,6-xylylmethyl) adipamide

A solution of 772 parts of 1-chloromethyl-2,6-xylene and 1200 parts of N,N-diethylaminoethylamine in 4500 parts of anhydrous toluene is heated at reflux temperature for 12 hours, cooled and extracted with dilute hydrochloric acid. The acidic extract is rendered alkaline by addition of sodium hydroxide and extracted with ether. This extract is dried over anhydrous potassium carbonate, filtered and evaporated, yielding the N-(β-diethylaminoethyl)-2,6-dimethylbenzyl-amine as an oil which is distilled at about 132–135° C. and 1 mm. pressure.

A solution of 468 parts of the distillate in 2500 parts of butanone is mixed slowly with 183 parts of adipyl chloride. The spontaneous reaction is completed by heating at reflux temperature for an hour and ethanol is added to destroy the unreacted adipyl chloride. After cooling the precipitated dihydrochloride is collected on a filter and recrystallized from isopropanol, using charcoal decolorization. The salt is then dissolved in dilute hydrochloric acid. The solution is rendered alkaline by addition of ammonia and the base is extracted with ether. This ether extract is dried over anhydrous potassium carbonate, filtered and evaporated to yield the N,N'-bis(β-diethylaminoethyl)-N,N'-di(2,6-xylylmethyl-adipamide as a clear, orange oil which is distilled at about 271–279° C. and 1.0–1.5 mm. pressure. It has the structural formula

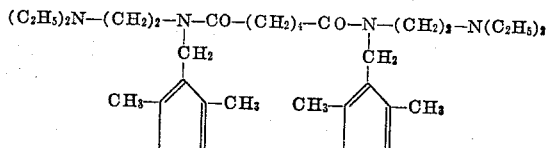

EXAMPLE 10

N,N'-bis(-diisopropylaminoethyl-N,N'di(2-naphthyl)suberamide

A suspension of 86 parts of 2-naphthylamine, 80 parts of β-chloroethyldiisopropylamine, 125 parts of potassium carbonate, 2 parts of copper bronze powder and 400 parts of benzene is heated under reflux and stirred for 12 hours. The reaction mixture is then cooled, treated with 550 parts of 10% aqueous sodium hydroxide and extracted twice with 300 parts portions of ether. These extracts are washed with water and saturated sodium chloride solution and then dried over anhydrous magnesium sulfate. The ether is evaporated and the 2-naphthylamine distilled off at 190–205° C. and 20 mm. pressure.

20 parts of the N-(β-diisopropylaminoethyl)-2-naphthylamine thus obtained and 10 parts of suberyl chloride in 250 parts of butanone are heated at reflux temperature for 2 hours and then treated with a sufficient amount of ethanol to decompose all of the unreacted acid chloride. The reaction mixture is then concentrated on the steam bath and the relatively insoluble dihydrochloride is extracted with a large volume of dilute hydrochloric acid. This extract is washed with ether, rendered alkaline by addition of dilute ammonium hydroxide and extracted with ether. The ether extract is dried over anhydrous calcium sulfate, stirred with decolorizing charcoal, filtered and evaporated to yield the N,N'-bis(β-diisopropylaminoethyl)-N,N'-di(2-naphthyl)suberamide as a high boiling, orange oil which has the structural formula

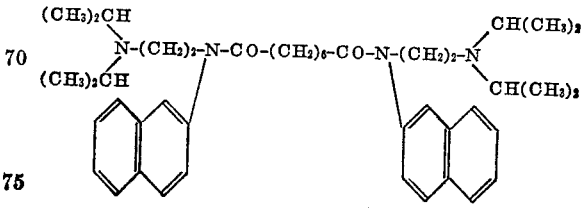

I claim:

1. An amide of the structural formula $$RR'N-Alk-N(Ar)-CO-(CH_2)_n-CO-N(Ar)-Alk-NRR'$$

wherein Ar is a member of the class consisting of lower aryl radicals containing 6 to 10 carbon atoms and lower aralkyl radicals wherein an aryl radical containing 6 to 10 carbon atoms is attached to the amido nitrogen through a lower alkylene radical, Alk is a lower alkylene radical containing at least 2 carbon atoms, R and R' are lower alkyl radicals, and $n$ is a whole number between 0 and 8 inclusive.

2. An amide of the structural formula $$RR'N-Alk-N(Ar)-CO-(CH_2)_n-CO-N(Ar)-Alk-NRR'$$

wherein Ar is an aryl radical containing 6 to 10 carbon atoms, Alk is a lower alkylene radical containing at least 2 carbon atoms, R and R' are lower alkyl radicals, and $n$ is a whole number between 0 and 8 inclusive.

3. A lower N,N'-bis(dialkylaminoalkyl)-N,N'-diaryloxamide of the structural formula $$RR'N-Alk-N(Ar)-CO-CO-N(Ar)-Alk-NRR'$$

wherein Ar is an aryl radical containing 6 to 10 carbon atoms, Alk is a lower alkylene radical containing at least 2 carbon atoms, and R and R' are lower alkyl radicals.

4. An amide of the structural formula $$(lower\ alkyl)_2N-Alk-N(C_6H_5)-CO-CO-N(C_6H_5)-Alk-N(lower\ alkyl)_2$$

wherein Alk is a lower alkylene radical containing at least 2 carbon atoms.

5. Bis(β-diethylaminoethyl)oxanilide.

6. An amide of the structural formula $$RR'N-Alk-N(Ar)-CO-Alk'-CO-N(Ar)-Alk-NRR'$$

wherein Ar is an aryl radical containing 6 to 10 carbon atoms, Alk' is a lower alkylene radical, Alk is a lower alkylene radical containing at least 2 carbon atoms, and R and R' are lower alkyl radicals.

7. A lower N,N'-bis(dialkylaminoalkyl)succinanilide of the structural formula $$RR'N-Alk-N(Ar)-CO-(CH_2)_2-CO-N(Ar)-Alk-NRR'$$

wherein Ar is an aryl radical containing 6 to 10 carbon atoms, Alk is a lower alkylene radical containing at least 2 carbon atoms, and R and R' are lower alkyl radicals.

8. An amide of the structural formula $$(lower\ alkyl)_2N-Alk-N(C_6H_5)-CO-CH_2-CH_2-CO-N(C_6H_5)-Alk-N(lower\ alkyl)_2$$

wherein Alk is a lower alkylene radical containing at least 2 carbon atoms.

9. Bis(β-diethylaminoethyl)succinanilide.

10. An amide of the structural formula $$RR'N-Alk-N(Alk'/Ar)-CO-Alk''-CO-N(Alk'/Ar)-Alk-NRR'$$

wherein Ar is an aryl radical containing 6 to 10 carbon atoms, Alk is a lower alkylene radical containing at least 2 carbon atoms, Alk' and Alk'' are lower alkylene radicals and R and R' are lower alkyl radicals.

11. An amide of the structural formula $$RR'N-Alk-N(Alk'/Ar)-CO-CO-N(Alk'/Ar)-Alk-NRR'$$

wherein Ar is an aryl radical containing 6 to 10 carbon atoms, Alk is a lower alkylene radical containing at least 2 carbon atoms, Alk' is a lower alkylene radical, and R and R' are lower alkyl radicals.

12. An amide of the structural formula $$RR'N-Alk-N(Alk'/C_6H_5)-CO-CH_2-CH_2-CO-N(Alk'/C_6H_5)-Alk-NRR'$$

wherein Alk is a lower alkylene radical containing at least 2 carbon atoms, Alk' is a lower alkylene radical, and R and R' are lower alkyl radicals.

13. An amide of the structural formula $$(lower\ alkyl)_2N-Alk-N(CH_2/C_6H_5)-CO-CH_2-CH_2-CO-N(CH_2/C_6H_5)-Alk-N(lower\ alkyl)_2$$

wherein Alk is a lower alkylene radical containing at least 2 carbon atoms.

JOHN W. CUSIC.

No references cited.